Jan. 2, 1968  G. C. PARKINSON  3,360,906
WATER COOLING TOWERS

Filed Dec. 13, 1965  2 Sheets-Sheet 1

Inventor
G.C. PARKINSON
By
Holcombe, Wetherill-Brisebois
Attorneys

Jan. 2, 1968   G. C. PARKINSON   3,360,906
WATER COOLING TOWERS
Filed Dec. 13, 1965   2 Sheets-Sheet 2
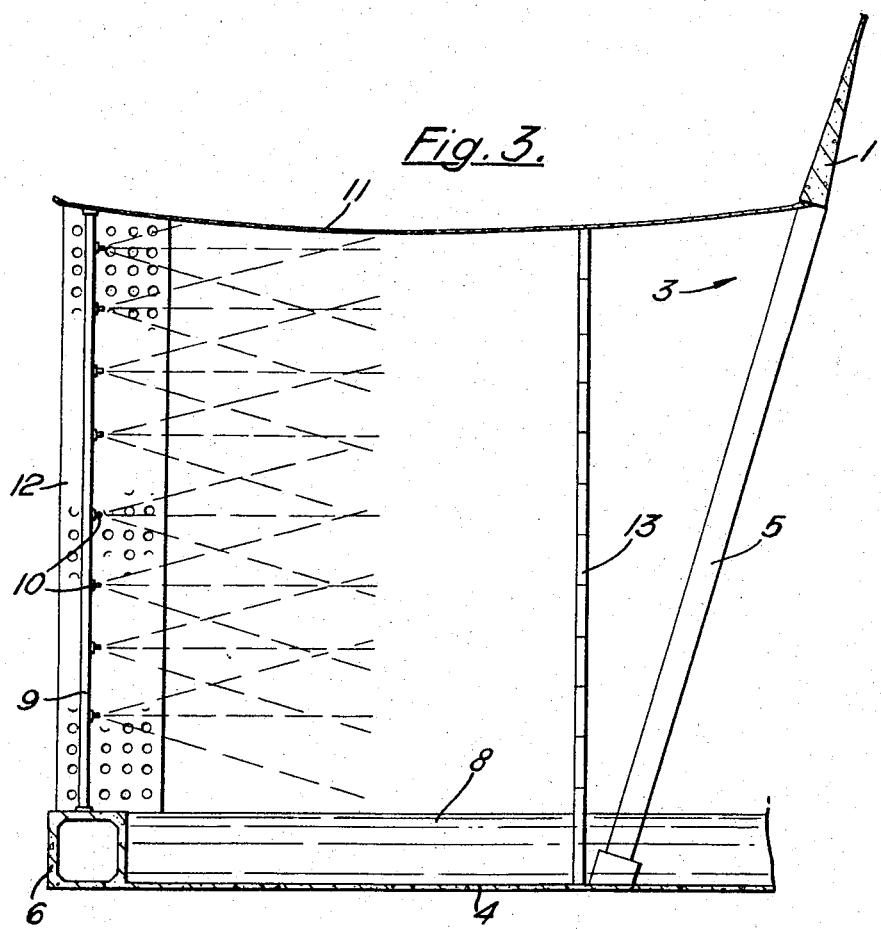
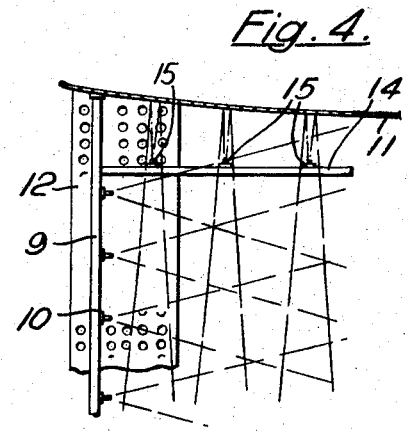
Inventor
G.C. PARKINSON
By
Holcombe, Wasserill & Brisebois
Attorneys

United States Patent Office 3,360,906
Patented Jan. 2, 1968

3,360,906
WATER COOLING TOWERS
Graham Charles Parkinson, West Byfleet, Weybridge, England, assignor, by mesne assignments, to The L. T. Mart Company Limited, Kansas City, Mo., a corporation of Delaware
Filed Dec. 13, 1965, Ser. No. 513,356
Claims priority, application Great Britain, Apr. 20, 1965, 16,568/65
7 Claims. (Cl. 55—257)

This invention relates to water cooling towers having an upright tubular shell with an open top and an opening around the bottom of its periphery which is supported on the ground. Air is caused to flow by convection in through the opening at the bottom of the tower and out through the top. For structural reasons and to improve this flow, the wall of the tower is generally circular and is preferably hyperbolic although this is not absolutely essential. The water is to be cooled is introduced into contact with the flow of air through the tower so that some of the water is evaporated and the temperature of the remainder is thus reduced.

In the most common form of cooling tower, the water falls downwards through a packing which extends over substantially the whole cross-section of the tower near its bottom and the water either flows in a thin film over this packing or is broken up by the packing into droplets to give the water a large surface area which is brought into contact with the air flow. The present invention is, however, concerned with a tower in which the water is supplied to the air flow through spray nozzles which break the water up into very fine droplets and no packing is therefore necessary. These towers are commonly known as spray cooling towers.

In one form of spray cooling tower, the water is introduced into the air flow by horizontally extending pipes inside the outer part of the tower adjacent the top of its peripheral opening. The water is sprayed upwards in the air flow and it then falls downwards again in counterflow to the air.

The inventor has found that this arrangement is not entirely satisfactory because the falling spray of water restricts the flow of air through the tower to an undesirable extent.

According to this invention, a spray cooling tower is provided with spray nozzles in a ring outside the peripheral opening at the bottom of the tower, and with a hood extending outwards around the top of the peripheral opening above the spray nozzles, the spray nozzles being arranged to produce an inwardly directed spray and the hood directing the flow of air inwards through the opening in the direction of the water sprays so that the flow of air through the tower is assisted by these sprays.

This arrangement is substantially more efficient than that in which the water is sprayed upwards inside the tower and then allowed to fall downwards again because, for a given temperature difference between the bottom of the top of the tower, the flow of air through the tower is substantially greater and the heat exchange between the air and the water sprays is maintained.

This improvement stems from the realisation on the inventor's part that although an arrangement in which the water droplets flow counter to the air is desirable in the kind of tower of tower in which the water flows over a packing because the water is not broken up into very small droplets, the counterflow is not necesary in a spray cooling tower because the size of the droplets is much smaller and in consequence the ratio of their surface area to volume and also their surface curvature is much greater and for these reasons efficient heat transfer is achieved with the water and the air flowing in the same direction.

Although the water is sprayed inwards from the nozzles, it will of course eventually fall downwards under gravity and at this stage of the flow of the sprays, the direction of flow is at right angles to the flow of air so that there is some cross-flow as well as the flow in the same direction as the air.

As is usual with all spray cooling towers, a spray eliminator is necessary in the path of the air flow after the air has passed through the water sprays to eliminate residual water droplets from being permanently trapped in the flow of air and carried upwards through the tower and out of its top. The spray eliminator may be of any of the usual kinds and may consist for example of a series of curved louvre blades between which the air flow with the water droplets entrapped in it passes. The eliminator, is preferably also provided just outside the tower adjacent the opening extending around the bottom of the periphery of the tower. The eliminator then lies in between the base on which the tower shell is constructed and the hood which extends outwards around the top of the peripheral opening for directing the air horizontally inwards.

The spray nozzles which are arranged in a ring outside the peripheral opening in the bottom of the tower may be arranged in a number of layers one above the other at intervals over the whole height of the bottom opening of the tower. The nozzles are preferably fixed to a series of upright pipes extending from a pressure ring main extending around the outside of the bottom of the peripheral opening. Alternatively, however, the nozzles may be fixed to a series of ring-shaped headers extending around the outside of the opening one above the other. In either case the water is preferably supplied from the pressure main below the nozzles so that the head of the water supply to the nozzles decreases in each successive layer of nozzles upwards from the bottom to the top of the peripheral opening. The inwardly directed sprays therefore penetrate further towards the eliminator at the bottom of the peripheral opening of the tower than near the top of this opening.

To increase the spray density at the top of the opening, that is near the hood which extends outwards from the shell at the top of the opening, a number of radially inwardly directed pipes may be provided carrying further spray nozzles. These radially inwardly directed pipes may either extend one from each upright pipe, when these are provided, or at intervals from the uppermost ring-shaped header when these are provided in place of the upright pipes. The nozzles on the radially inwardly directed pipes spray water upwards so that it then falls downwards again, but when this happens the downwardly falling water droplets are not in counterflow to the flow of air, but are in cross-flow as at this position between the hood and the base on which the tower is carried, the flow of air is horizontally inwards. The inventor has found that a cross-flow of water droplets in this way provides much less resistance to the flow of air than is provided by the same volume of water in droplets flowing counter to the flow of air. As the radially inwardly directed pipes are near the top of the upright pipes, or extend from the uppermost ring-shaped header, the pressure in them is only the same as that at the uppermost inwardly directed nozzles and in consequence only a a small proportion of the total volume of water flows from them.

To reduce undesirable effects on the inwardly directed sprays by wind blowing in a tangential direction under the hood, a series of upright baffles may be provided in radial planes between the hood and the ground, or the pressure main, below, and these baffles may be perforated. The baffles protect the inwardly directed sprays of water as they leave the nozzles from being blown sideways by the wind, they also assist in directing the flow of convection air directly radially inwards into the tower and they may support the outside edge of the hood.

An example of a spray cooling tower constructed in accordance with the invention, together with a modification of this tower, are illustrated in the accompanying drawings in which:

FIGURE 3 is a radial section to a much larger scale through the opening at the bottom of the tower and through the parts of the tower arranged outside this opening; and, FIGURE 4 is a radial section similar to a part of FIGURE 3, but showing a modification.

Figure 2:
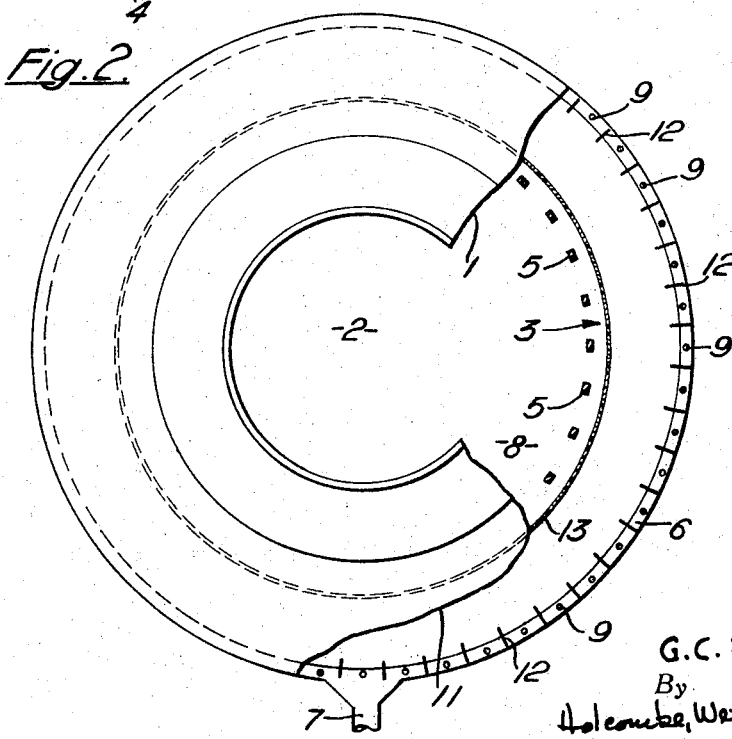
FIGURE 2 is a plan of the tower with parts broken away and in section.

The tower has a circular reinforced concrete shell 1 having a wall of conventional hyperbolic section. The shell 1 has an open top 2 and a peripheral opening 3 around its bottom. To provide the opening 3, the shell 1 is supported from a reinforced concrete base 4 by a series of reinforced concrete legs 5. The base 4 is surrounded by a reinforced concrete box culvert forming a pressure main 6 for the supply of the water which is cooled in the tower. The water flows to the pressure main 6 through a culvert 7 shown in FIGURE 2. The base 4 and the pressure main 6 together bound a pond 8 into which the cooled water falls and from which it is recirculated.

A series of pipes 9 extend vertically upwards from the pressure main 6 and each pipe has a series of spray nozzles 10 attached to it so that these nozzles are arranged in layers in rings outside the opening 3. The upper ends of the pipes are closed and the lower ends communicate with the pressure main 6 so that water flows from the pressure main through the nozzles 10 in radially inwardly directed sprays.

A hood 11 extends outwards from the bottom edge of the shell 1 around the top of the opening 3 and has its outer edge supported by a series of perforated baffles 12 laying in radial planes in between the pipes 9. A spray eliminator 13 which is shown diagrammatically, but has a number of closely spaced louvres through which the flow of air flows inwards, extends from the surface of the water in the pond 8 up to the hood 11. The spray eliminator 13 is conventional and causes any droplets of water remaining in the inwardly flowing air stream when this reaches the eliminator to be ejected from the air stream and to flow down the eliminator into the pond 8 so that the air stream flowing through the opening 3 and up out of the open top of the tower 2 contains only water vapour.

When the cooling tower is in use, air is caused to flow by convection inwards through the space between the outside of the hood 11 and the pressure main 6 thence through the opening 3 and upwards through the shell 1 and out of its open top 2. As the air flows inwards, flow is assisted by the sprays of water issuing from the nozzles 10 and it evaporates water from the droplets in these sprays so that the remaining water in the droplets which falls downwards into the pond 8 is cooled.

Figure 1:
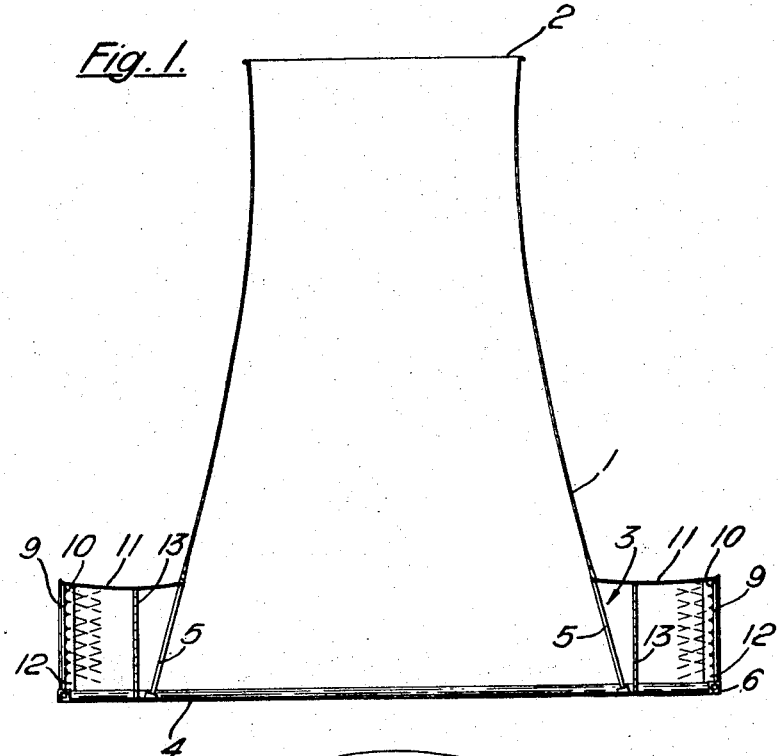
FIGURE 1 is a vertical diametric section through the tower.

In the modification illustrated in FIGURE 4, each of the vertical pipes 9 has a short horizontal pipe 14 extending inwards from its upper end. Each of the pipes 14 carries four upwardly directed spray nozzles 15 from which further water is sprayed upwards and subsequently falls downwards in the stream of air flowing horizontally inwards. The additional spray nozzles 15 increase the spray density at the top of the space under the hood 11. The remaining parts of the modification described with reference to FIGURE 4 are the same as in the example illustrated in FIGURES 1 to 3.

I claim:

1. In a spray cooling tower including a tubular shell, an open top to said shell, and an opening around the bottom of said shell, spray nozzles for spraying water to be cooled into contact with air flowing through said shell, and means for supplying said water to said nozzles, the improvement wherein said nozzles are arranged in a ring around and outside said opening around the bottom of said shell, and further comprising a hood extending outwards from said shell around the top of said opening above said spray nozzles, said spray nozzles being arranged to produce inwardly directed sprays and said hood directing said air flowing through said shell inwards through said opening in the direction of said sprays whereby said flow of air through said shell is assisted by said sprays.

2. A cooling tower as claimed in claim 1, further comprising a spray eliminator extending downwards from said hood outside said shell and adjacent said opening.

3. A cooling tower as claimed in claim 1, further comprising means supporting said spray nozzles in a plurality of layers one above the other at intervals over the height of said opening around the bottom of said shell.

4. A cooling tower as claimed in claim 3, wherein said means for supplying water to said nozzles includes a pressure ring main extending around the outside of the bottom of said opening and said means supporting said nozzles includes a plurality of upright pipes extending upwards from said pressure ring main at spaced intervals around the outside of said shell.

5. A cooling tower as claimed in claim 3, further comprising a plurality of radially inwardly directed pipes and a plurality of nozzles fixed to each of said pipes, said pipes being adjacent said hood and said nozzles being arranged to spray water upwards so that it then falls downwards again beneath said hood to increase the spray density near the top of said opening around the bottom of said shell.

6. A cooling tower as claimed in claim 1, further comprising a plurality of upright baffles extending downwards in radial planes from said hood between said spray nozzles to reduce the effect on said sprays of wind blowing under said hood in a direction tangential to said shell.

7. A cooling tower as claimed in claim 6, wherein said baffles support said hood.

References Cited

UNITED STATES PATENTS

| | | |
|---|---|---|
| 2,247,514 | 7/1941 | Mart. |
| 2,732,190 | 1/1956 | Mart. |
| 2,907,554 | 10/1959 | Heller. |
| 3,322,409 | 5/1967 | Reed. |

FOREIGN PATENTS

| | | |
|---|---|---|
| 631,512 | 6/1936 | Germany. |
| 1,033,943 | 6/1966 | Great Britain. |

HARRY B. THORNTON, *Primary Examiner.*

E. H. RENNER, *Assistant Examiner.*